Feb. 20, 1973   E. I. VALYL   3,717,544
LINED PLASTIC ARTICLES
Filed Sept. 14, 1970

INVENTOR.
EMERY I. VALYI
BY
ATTORNEY

United States Patent Office 3,717,544
Patented Feb. 20, 1973

3,717,544
LINED PLASTIC ARTICLES
Emery I. Valyl, 5200 Sycamore Ave.,
Bronx, N.Y. 10471
Filed Sept. 14, 1970, Ser. No. 71,734
Int. Cl. B32b 27/08; B65d 25/14
U.S. Cl. 161—252
6 Claims

ABSTRACT OF THE DISCLOSURE

Method and apparatus for making lined plastic containers in which a liner is placed over a blow core, a plastic parison is injected around the blow core and liner in a parison mold and the parison together with the liner is blown in a blow mold. The liners may be preformed and inserted over the blow core before the blow core is placed in the parison mold.

---

This invention relates to the manufacture of plastic containers that are provided with a liner or inner layer having different properties than the remainder of the container.

Such lined containers are desirable whenever it is difficult to satisfy all of the requirements and specifications by using a single grade of plastic.

For example, the low cost, easy formability and transparency of polystyrene would make this material suitable for containers for many food commodities; however, the permeability of polystyrene limits such use in connection with commodities that are damaged by oxidation. In other instances, the solubility of a given plastic limits its use.

In instances of this kind, it has been attempted to provide a composite lined container, wherein the container wall is composed of more than one substance.

However, the economical production of such containers was heretofore difficult.

An object of the present invention is to provide an economical procedure for the production of lined containers that combine several plastics within the same container body.

It has been heretofore proposed to produce lined containers by first forming a parison, inserting that parison while in a hot and deformable condition into a previously blown container made of a plastic that is different from the plastic of the parison and expanding said parison into conformance with the container to form an inner liner for the walls of the container.

The difficulties in this procedure are mainly two-fold. The inner liner will tend to shrink away from the outer wall instead of adhering to it and the adhesion will be further impaired by the fact that the contacting surfaces of the liner and the container are too cold at the time of contact to weld together.

It has been proposed to avoid this difficulty by selecting plastics having similar heat expansion properties. While this may provide a solution to the problem of separation of the layers, it limits the choice of available plastics.

Such proposals have the disadvantage of being slow and uneconomical in execution.

My previous Pat. 3,349,155, dated Oct. 24, 1967 (V–210), discloses an injection blow molding system wherein a parison is formed on a blow core in a parison die. The blow core with the parison thereon is placed into a blow mold wherein the parison is blown into the form of the finished article after which the blow core is retracted to a conditioning station where it is conditioned as by an applied coating before the next injection step, i.e. before being returned to the parison die.

The present invention provides an improvement over the above described procedure wherein coating of the blow core is performed by means of a liner which is preformed and applied to the blow core as a unit while the blow core is in the conditioning station. Such liners may be produced by forming the coating material into a shape which corresponds to the shape of the blow core. The liner element so formed is placed over and into intimate contact with the blow core in the conditioning station and the blow core so coated is inserted into a parison mold, where hot, deformable plastic is injected over the liner.

The nature of the invention will be better understood from the following description taken in connection with the accompanying drawing in which a specific embodiment has been set forth for purposes of illustration.

Figure 1:
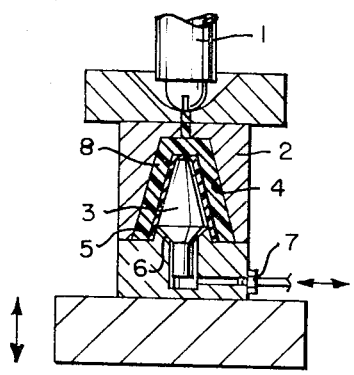
FIG. 1 is a section of a parison mold embodying the present invention.

Referring to the drawings, FIG. 1 shows an assembly consisting of an injection nozzle 1 as a source of hot, moldable plastic, from which that plastic may be injected into a parison mold 2. The parison mold coacts with blow core 3 to provide mold cavity 4 which may be filled with plastic from nozzle 1 under pressure, as is customary in injection molding. Prior to insertion of the blow core into the parison mold, the blow core 3 is provided with a liner-insert 5 which fits snugly over the blow core. The molten plastic is then injected over the liner insert to fill the cavity 4. The blow core is provided with blow slot 6 which may be opened and closed by conventional means (not shown) and which communicates with a source of pressure fluid, or vacuum by means of a connection 7 indicated schematically.

As known from the practice of injection blow molding the blow core 3 is usually kept at an elevated temperature, such as by means of internal circulation of a heated fluid. Accordingly, the liner insert 5 will be heated by the core, once they are brought into contact with each other. After injection of molten plastic the liner insert 5 will be further heated, to a temperature approaching that of the incoming plastic. When so heated, the liner insert 5 is rendered deformable and also, it will become sealed to the freshly injected plastic.

After the injectio step, the blow core 3 is removed from the parison mold 2 with the parison 8 which is now in effect lined on its inside with the material of the liner insert 5 which adheres to the parison 8. After removal, the blow core and parison are placed in a blow mold 9 and the parison is blown, by admitting air through the blow slot 6, into conformance with the blow mold, from which the blown article may then be removed. These steps of the process are not shown, since they are well known in the art.

Figure 2:
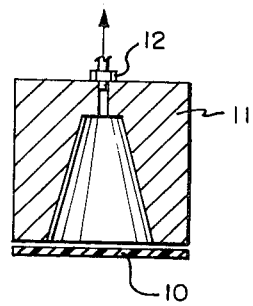
FIG. 2 is a diagrammatic view of the forming mold in which the liner is formed.

In order to provide the liner inserts 5 for this procedure, a sheet of the material from which the liner is to be made may be heated to a temperature at which that material becomes deformable. The heated sheet 10 is then placed into juxtaposition with a linear mold 11, vacuum is applied in the mold cavity of the liner mold through connection 12 and the sheet converted into the desired shape by vacuum forming, i.e. by drawing that intrinsically produces attenuation of the sheet. Several liner inserts so formed may now be stacked and placed into a holding fixture 13 shown in FIG. 3 which may be brought into alignment in the blow core 3. The forming of the liner insert 5 may be one at a time or continuous, both methods being well known in the art. If it is continuous, the product of the forming operation will correspond to the formed web 14 shown in FIG. 4 in which portions 15 that are shaped to correspond to the forming mold 11 of FIG. 2 are joined by parts of the undeformed web 16. As an alternate to placing the insert liners into a holding fixture 13, as in FIG. 3, such a web 16 may be fed over the blow core 3 in a manner such that one formed portion 15 after another is brought into juxtaposition with blow core 3. Obviously, the formed liner inserts must be severed from web 16; however, this may be done before or after placing the liners 5 over the blow core 3.

As a further alternate, an undeformed web may be brought into juxtaposition with the blow core and the blow core itself used to form the liner in the web.

Figure 3:
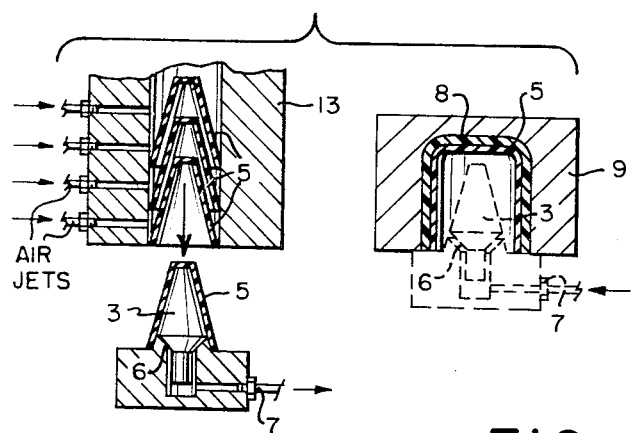
FIG. 3 shows diagrammatically a holder for the stacked liners and the blow mold in relation to the blow core.
Figure 4:
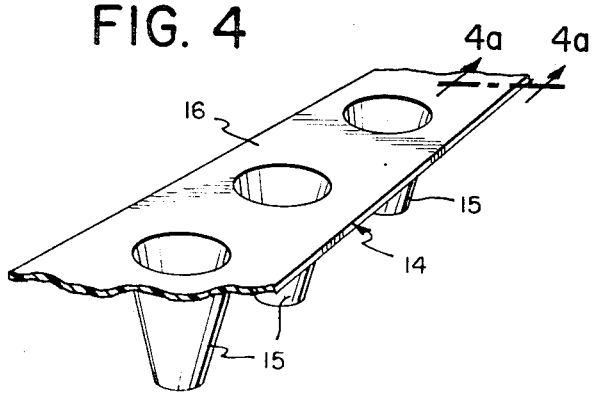
FIG. 4 is a partial elevation showing a web carrying a plurality of formed liners before severing and stacking.

If the liners 5 are applied to the blow core from a holding fixtures 13 as shown in FIG. 3, one procedure to cause them to adhere firmly to the blow core 3 may consist of the following: After the fixture 13 and the blow core 3 are aligned, the blow core is inserted relatively loosely into the first liner it encounters. The liners in the fixture are not firmly stacked and may, if necessary, be kept slightly separated one from the other by jets of air acting between the liners. Once the blow core 3 is thus inserted, vacuum may be applied through the blow slot 6 and the liner thereby caused to be pressed against the blow core so that it will then remain attached thereto. Thereafter the blow core 3, with the liner adhering, is removed from the fixture 13 which may be shifted to the side. The blow core with liner may now be placed into the parison mold and the aforedescribed parison molding procedure repeated. Holding fixture 13 may of course be arranged to carry only a single liner insert 5 which, in that case, would be inserted into the fixture at a station alongside the assembly, for transfer onto the blow core.

Figure 5:
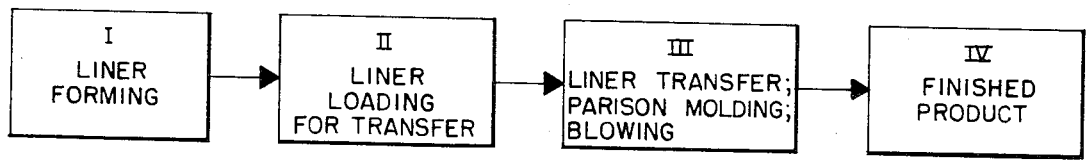
FIG. 5 is a block diagram illustrating the stages in the process.

The arrangement may accordingly be schematically represented by the diagram of FIG. 5. In that diagram Operation I indicates the forming of the liner 5. It is then transferred to Operation II in which it is inserted into holding fixture 13 or in which the web 14 is made ready for alignment with the blow core 3. Operation III consists of applying the liner to the blow core, inserted in the blow core, so conditioned, into the parison mold, molding the parison and removing with the blow core into the blow mold 9 and blowing. After blowing, the blow core is removed and the blown article shifted, preferably while still within the blow mold 9, in the course of Operation IV.

As indicated previously, the purpose of applying a coating on the inside of the container by means of the liner insert is to provide the container with properties which a single plastic does not alone possess. For example, a coating of polyvinylidine chloride (PVDC) provides an excellent oxygen barrier in a polystyrene container which would otherwise be very pervious to oxygen. However, such PVDC liner inserts are very difficult to handle in the operations described because of their tendency to collapse and to stick together.

Figure 4A:
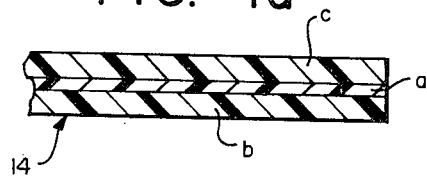
FIG. 4a is a section taken on the line 4a—4a of FIG. 4 showing the laminated web.

In order to facilitate the handling of such materials, the liner inserts may be made of a laminated film. FIG. 4a shows such a film in section wherein the film is made up of layers $a$, $b$ and $c$, of which layers $b$ and $c$ may be made of a plastic that is readily handled, while layer $a$ is made up of the PVDC or other plastic having similar properties. In some cases only two layers may be employed, depending on their nature.

Another reason for using such laminated film may be because of the further improvement obtained due to their combined properties. Thus the material that provides desirable permeability, or solvent resistance, may not be best for affecting adhesion to the inside of the parison or it may have undesirable optical properties which may be corrected by means of the additional layer or layers.

Usually, the container to be made is provided with the coating over its entire inside surface. Occasionally, however, some portions of the container should remain uncoated. In such instances, the liner insert is made with the corresponding wall area omitted.

In other cases, it is desired to have the coating film cover areas in which there is an opening in the container, for example, at a dispensing opening, so as to keep the contents sealed until the container is first used, such as for example, under a closure of a powder container with a sifter top.

Figure 6:
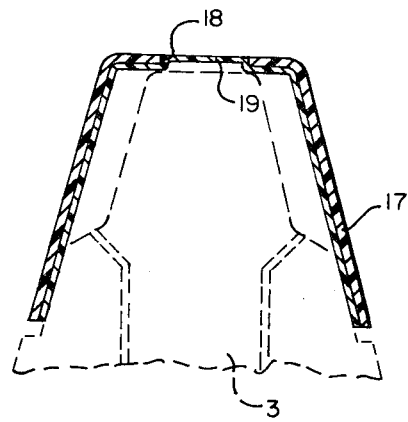
FIG. 6 is a sectional view showing a dispensing type container having a continuous liner over the dispensing opening.

Such containers may be made as indicted in FIG. 6 by applying a liner insert over the entire core, injecting the plastic only over selected portions of the core and then blowing the parison into the desired shape to produce the finished article 17, having a discontinuity 18 covered with the coating film 19.

What is claimed is:

1. A multilayered hollow plastic article composed of an inner first portion of a drawn thermoplastic material and an outer non-cellular second portion of a pressure molded polystyrene thermoplastic material, the two materials being adhered one to the other substantially over their entire contacting areas.

2. A composite plastic article as set forth in claim 1 in which said article has a neck opening and at least said inner portion is continuous except for said neck opening.

3. A composite plastic article as set forth in claim 1, in which said inner portion is composed of a plurality of laminations, said laminations being composed of plastics having different compositions with one of said plastics being polyvinylidine chloride.

4. A composite plastic article as set forth in claim 1 in which said article is a container.

5. A composite plastic article as set forth in claim 4 in which the inner portion is more impervious to fluids than the outer portion.

6. A composite plastic article as set forth in claim 4 in which the inner portion is composed of polyvinylidine chloride.

References Cited
UNITED STATES PATENTS

| | | | |
|---|---|---|---|
| 2,711,985 | 6/1955 | Olson | 156—287 X |
| 2,736,065 | 2/1956 | Wilcox | 156—287 X |
| 3,091,000 | 5/1963 | Makowski | 264—97 |
| 2,781,551 | 2/1957 | Richerod | 264—94 |
| 3,115,682 | 12/1963 | Soubier et al. | 264—97 X |
| 2,805,787 | 9/1957 | Sherman | 264—94 X |
| 3,113,831 | 12/1963 | Coale | 264—94 X |
| 3,381,717 | 5/1968 | Tyrrel | 161—139 X |
| 3,144,167 | 8/1964 | Schultz | 220—63 R |

PHILIP DIER, Primary Examiner

U.S. Cl. X.R.

156—242, 287; 220—63; 264—94, 97